United States Patent Office 3,745,033
Patented July 10, 1973

3,745,033
USEFUL WAX COMPOSITIONS
Robert B. Hutchison, Cincinnati, Ohio, assignor to Emery Industries, Inc., Cincinnati, Ohio
No Drawing. Filed Aug. 23, 1971, Ser. No. 174,252
Int. Cl. C08h 9/06
U.S. Cl. 106—270                                 8 Claims

ABSTRACT OF THE DISCLOSURE

This invention relates to compositions useful as substitutes for natural waxes. The compositions are obtained by blending high molecular weight α-branched monocarboxylic acids with microcrystalline petroleum wax and mixed glycerides of saturated mono- and dicarboxylic acids. The wax compositions exhibit emulsifier and stability characteristics similar to beeswax and may be employed in cosmetic formulations.

BACKGROUND OF THE INVENTION

Natural waxes possess physical characteristics making them useful for numerous applications, including cosmetics, where superior emulsifying characteristics are required. Many natural waxes such as wool wax and beeswax are capable of emulsifying large quantities of water and also forming stable emulsions with hydrocarbons such as mineral oil. Borax emulsions with beeswax have been demonstrated to have excellent stability.

While the various naturally occurring animal waxes have quite similar physical characteristics and in general are comprised predominantly of esters of fatty acids with monohydric fatty alcohols, the precise chemical makeup of the individual waxes varies considerably and is extremely complex, oftentimes indeterminable. Beeswax, for example, is about fifty percent esters of cerotic and palmitic acid with hydroxy esters, acid esters, cholesterol esters, diesters, free alcohols, free wax acids, hydrocarbons, moisture, minerals and other organic materials present in small amounts and making up the remainer of the composition. The complexity of the beeswax composition is such that it would be virtually impossible to exactly duplicate the composition of the natural product. Even if it were possible to accurately analyze and duplicate beeswax, it would be highly impractical and commercially unacceptable based on cost considerations.

In recent years, due to the increased consumption of the naturally occurring wax products and their limited supply, considerable effort has been made to prepare synthetic waxes which can be substituted for the natural products. For example, the esterification product for montanic acid, ethylene glycol and oxidized paraffin has been suggested as a substitute for beeswax as have waxes obtained by esterifying pentaerythritol with saturated fatty acids and maleic anhydride. Also suggested as possible substitutes for canauba wax or beeswax have been products obtained by oxidizing high-melting ozocerties and ceresins and subsequently esterifying them with $C_{1-30}$ alcohols. In general, however, while these wax substitues can be employed for the natural products in some applications they have not been completely acceptable as substitutes for beeswax in applications where beeswax is employed for its emulsifying properties. In some instances the synthetic beeswax substitutes had nearly identical physical properties but the performance characteristics, which are equally important, were considerably different and inferior to the natural product.

It would be highly desirable if a synthetic wax composition could be readily and cheaply obtained and if the composition had equivalent or superior performance characteristics compared to beeswax. It would be especially advantageous if the wax composition could be substituted for beeswax in cosmetic formulations and if the emulsifying characteristics of the substitute compared favorably with that of beeswax. It would be especially useful, if in addition to being able to essentially duplicate the emulsifying characteristics of beeswax, the synthetic wax compositions have similar emolliency characteristics, film-forming properties and lubricating properties to the naturally occurring product.

DETAILED DESCRIPTION

The compositions of the present invention useful as substitutes for natural waxes, primarily beeswax, are prepared by blending high molecular weight α-branched monocarboxylic acids and mixed glycerides of saturated mono- and dicarboxylic acids with microcrystalline petroleum wax in proportions which will be defined below.

The α-branched monocarboxylic acids will contain from about 20 up to about 60 or more carbon atoms and more preferably, from about 30 to about 45 carbon atoms. The presence of small amounts of acids containing shorter chain length acids is not detrimental to the resulting wax blend, however, best results are obtained with longer chain acids. In the most preferred embodiment of the present invention, a mixture of α-branched monocarboxylic acids are employed wherein said mixture contains acids ranging from about 20 carbon atoms to about 60 carbon atoms, with acids containing 30 or more carbon atoms comprising at least 65% by weight, and preferably over 75% by weight, of the overall acid composition.

The position alpha to the carboxyl group will be substituted with one or two hydrocarbon radicals such as an alkyl group, straight chain or branched, containing from one to about 16 carbon atoms. More preferably the alkyl branch will contain from 1 to 8 carbon atoms. The α-branched acids may be either α-alkyl monocarboxylic or α,α'-dialkyl monocarboxylic acids.

The α-alkyl branched monocarboxylic acids may be prepared by any known method. For instance, they are readily obtained by the free radical addition of α-olefins to acids such as propionic acid, butyric acid, valeric acid, 2-ethyl hexanoic acid, lauric acid, pelargonic acid, stearic acid or the like. Such processes are amply described in the prior art as, for example, British Pats. 960,894, 1,098,464 and 1,098,465 and U.S. Pat. 2,823,216. The reaction conditions employed, temperature, pressure, reactant ratio are not critical and may be widely varied. Any means of generating free radicals to initiate the reaction may be employed including hydrogen peroxide, inorganic and organic peroxides, persulfates, perborates, percarbonates, ultraviolet light, ozonides and the like. Another method for the preparation of the α-methyl branched monocarboxylic acids is by the reaction of ethylene with propionic acid in accordance with processes such as described in U.S. Pats. 2,433,015 and 2,585,723.

It is readily apparent that a mixture of α-alkyl branched monocarboxylic acids will generally be obtained employing the above-described processes. Relatively pure products having a narrow distribution of acid products are possible, however, if specific α-olefins of high purity are reacted with a high purity acid under carefully controlled reaction conditions. Since mixed α-alkyl branched acids are not detrimental to the resulting wax blend and since the high molecular weight α-olefins required to yield the desired acids are not generally available in high purity, it is most convenient to employ α-olefin mixtures as obtained from a given fractionation cut in certain petrochemical operations. Employing mixtures of α-olefins is not detrimental to the products obtained, either the α-alkyl branched monocarboxylic acid or the ultimate wax blend, as long as the olefin mixture is comprised predominantly of $C_{20+}$ olefins and contains 50% or more α-olefins wherein 65% or more, and preferably 75% or more, are $C_{28+}$ olefins. A mixture of olefins especially useful for the process of the invention is commercially available and contains about 22% by weight $C_{28}$ and lower olefins with about 78% by weight $C_{30+}$ olefins, about 60% by weight of the olefins being α-olefins. This olefin mixture, hereinafter designated as a $C_{30+}$ α-olefin, is reacted with propionic acid under free radical conditions the α-methyl branched monocarboxylic acid obtained, referred to as a $C_{33+}$ α-methyl branched acid, contains about 70% to 80% by weight acid products and about 20% to 30% unsaponifiable materials. The acid product is primarily comprised of the desired monocarboxylic acids, however, amounts of by-products including diacids, higher molecular weight carboxylic acids, etc., may be present in amounts generally not exceeding about 20% by weight.

The amount of the α-alkyl branched monocarboxylic acid employed to obtain the wax compositions of the present invention will range between about 45% and 70% by weight of the total composition. More preferably, these acids will constitute about 50% and 65% by weight of the wax blend. As desired, the α-alkyl branched monocarboxylic acids employed may be a mixture of acids obtained from several processes; they may be pure acids or a blend thereof; or, as is generally the practice, they may be the acids directly obtained by the free radical addition of a mixture of $C_{29+}$ α-olefins, preferably $C_{30+}$ α-olefins, with propionic or a like acid.

The second component of the wax blends of the present invention are mixed glycerides derived either from natural sources or synthetically produced. The natural product which may be employed is the wax obtained from the berries of the sumac-like tree Rhus succedanea and commonly known as Japan wax. Japan wax is a mixture of glycerol esters primarily of the following component acids: palmitic, stearic, oleic and saturated dicarboxylic acids containing about 21 to 23 carbon atoms. Japan wax is primarily tripalmitin with about 5% to 6% glycerol esters of the saturated dicarboxylic acids. Suitable synthetic mixed glycerides may be substituted for the naturally occurring Japan wax and are generally preferred due to the short supply of the natural product. The synthetic mixed glycerides are typically formed by the reaction of a mixture of suitable mono- and dicarboxylic acids with glycerine. They are primarily triglycerides but may contain mono- and diglycerides in limited amounts. The monocarboxylic acids employed to obtain the mixed glycerides contain between about 14 and 20 carbon atoms with stearic and palmitic acids, or mixtures thereof, being generally preferred. Essentially equimola mixtures of stearic and palmitic acid have been found especially useful.

Reacted with the monocarboxylic acids is one or more short-chain dicarboxylic acids containing between about 6 and 12 carbon atoms. Azelaic acid is an especially useful dicarboxylic acid. The mono- and dicarboxylic acids are primarily saturated, and unsaturated acids should not be present in amounts exceeding about 5% by weight. The molar ratio of reactants employed to prepare the suitable synthetic waxes will range from about 1–4:0.25–1.5:1 and preferably be 1.5–2.5:0.5–1:1 (monocarboxylic acid: dicarboxylic acid: glycerine). The synthetic mixed glycerides prepared in this manner have acid values from about 45 to 65 and a viscosity at 140° C. of about 100 to 110 centistokes. The amount of natural or synthetic glyceride material employed to obtain useful blends in accordance with the present invention will range from about 15% to about 40% by weight and more preferably from about 20% to 35% by weight of the overall wax composition.

The final component of the instant wax blends will be a microcrystalline petroleum wax present in an amount ranging from about 5% to 25% by weight of the total composition. Excellent results are obtained when the microcrystalline comprises about 10% to 20% by weight of the wax composition and is hard wax melting between about 180° F. and 200° F. Such waxes are comprised of hydrocarbons, straight-chain, branched chain and cyclic, containing about 40 to 70 carbon atoms and have the physical appearance of very small needles. Excellent results are obtained when the microcrystalline wax employed has a melting point between about 190 and 195° F. The microcrystalline wax may be employed as such or it may be oxidized where it is desired to have an increased saponifiable content. Such oxidation processes are well known to the art to produce oxidized materials which are relatively hard, high melting, generally between 180 and 200° F., having acid numbers from about 12 to 30 and saponification numbers from about 45 to 80.

The present wax blends are primarily useful in applications where superior emulsification properties are required. Due to their ability to essentially duplicate the emulsifying characteristics, emolliency characteristics, film-forming properties and lubricating properties beeswax the products obtained by blending the α-methyl branched monocarboxylic acid with natural or synthetic mixed glycerides and a microcrystalline petroleum wax in the proportions described above are especially useful for cosmetics. Depending on the particular components employed and the application for which the end product is to be used, the proportions of the various components will be varied accordingly. In general, however, the resulting wax compositions melt over the range from about 55° C. to 75° C. and have an acid value from about 40 to 50 and a saponification value from about 90 to 115. The color of the waxes will not generally exceed 4 on the Gardner scale.

The individual components are readily blended together employing conventional methods and no special processing is required. Melt blending the materials at a temperature just above the melting point of the microcrystalline petroleum wax is generally employed to insure that a homogeneous mixture is obtained. While the individual wax components are generally blended prior to use in cosmetic formulations or the like it is not essential. If desired, the wax components may be combined with one or more of the other ingredients present in the cosmetic formulations and this overall mixture then blended. Compatibility of the ingredients and the complexity of the particular cosmetic formulation must be considered in determining whether the components of the wax composition of the present invention are blended by themselves or in combination with other ingredients.

Other compounds which may be employed in combination with the present wax compositions include hydrocarbon oils such as mineral oil and white oil; other primary or secondary emulsifiers, preferably of the nonionic type, such as glycerol monostearate, sorbitan esters, lanolin derivatives and ethoxylated esters, acids and alcohols; emollients such as isopropyl myristate; humectants such as glycerine and propylene glycol; fatty acids; fatty amides; preservatives; amines; alkanol amines such as ethanol amine; perfumes; dyes; water; and the like. In general, when the wax compositions of this invention are employed as beeswax substitutes in various cosmetic formulations the amount employed will generally not exceed about 50% by weight of the total composition, the remainder being comprised of one or more of the aforementioned compounds. In formulations where the present wax compositions are employed primarily for emulsification purposes, either oil in water or water in oil, they will typically comprise about 2% to about 20% by weight of the total composition. The oil, which is generally mineral oil, may be varied in accordance with the requirements of the particular emulsion formulation but most generally will constitute between about 20 and 60% by weight of the total composition.

Exemplary cosmetic formulation in which the present wax compositions may be employed are: absorption base creams, all-purpose creams, camphor ice, anti-chap lipstick, vanishing creams, cold creams, mascaras, cleansing creams, foundation creams, hair creams, lipstick, hand lotions, rouges, suntan creams, and the like. The wax blends may also be added to various other formulation to replace natural waxes including: dental preparations; adhesives and cements; putty and caulks; crayons, inks and paints; polishes and waxes; lubricants; and the like.

The following examples serve to illustrate the invention more fully, however, these examples are not intended as a limitation on the scope thereof and various modifications can be made without departing from the spirit or scope of the invention. In the examples all parts are on a weight basis unless otherwise indicated.

Example I (A) Preparation of $C_{22+}$ α-methyl branched monocarboxylic acid: A 1-liter glass reactor was charged with 200 grams of an olefin mixture comprised of about 60% α-olefins with about 80% of the olefins being $C_{20}$ and higher olefins, 326 grams propionic acid and 8 grams di-t-butyl-peroxide initiator. The system was flushed with nitrogen and a slight nitrogen flow maintained while the reaction mixture was heated at reflux for 4 hours. At the completion of reaction unreacted propionic acid was removed under vacuum at 200° C. and 225 grams of the desired product having an acid value of 48 was recovered.

(B) Preparation of $C_{32+}$ α-heptyl branched monocarboxylic acid: Employing a reaction procedure similar to that described in Part A, pelargonic acid and the $C_{30+}$ olefin mixture were reacted in a 10:1 molar ratio to obtain the α-heptyl $C_{32+}$ monocarboxylic acid.

Example II

Preparation of mixed glycerides of mono- and dicarboxylic acids: A 250 ml. glass reactor was charged with 64 grams stearic acid, 235 grams azelaic acid and 12.5 grams glycerine. The reaction mixture was heated to about 250° C. and heated with stirring under a nitrogen atmosphere for about 2 hours. 92 grams mixed glyceride product was recovered. The product had an acid value of 51.7, saponifiaction value of 278 and a viscosity at 140° C. at 109.8 centistokes with a color of 1 on the Gardner scale.

Example III

Forty parts of the $C_{32+}$ α-methyl branched monocarboxylic acid of Example I(A) was melt blended with 20 parts of the mixed glyceride of Example II and 10 parts of a 190/195 microcrystalline petroleum wax. The resulting smooth and uniform wax composition melted over the range 64–75° C., had an acid value of 40.4, a saponification value of 107.2 and a Gardner color of about 2. A borax emulsion was prepared employing 20 grams of the wax blend, 50 grams mineral oil, 33.5 grams water and 1 gram borax. The emulsion had excellent stability and gloss, a smooth texture and was comparable to an identical emulsion prepared with beeswax.

Example IV

A lipstick was prepared in accordance with the following formulation:

15 parts wax blend of Example III
10 parts carnauba wax
5 parts lanolin
5 parts cetyl alcohol
65 parts castor oil
2 parts tetrabromofluorescein The composition was smooth, had excellent compatibility with the dye and molded readily into a stick. The lipsticks gave a smooth even application with a minimum amount of pressure and an excellent film was obtained.

Example V

A cream was prepared from the wax blend of Example III as follows:

20 parts wax blend
50 parts mineral oil
33.5 parts water
1 part triethanolamine

When placed in an oven maintained at 37° C., no change was detected in the cream for up to one week. After one week a slight amount of liquid was observed to separate with complete phase separation after three weeks. The stability obtained employing the wax blends of the present invention was identical to that obtained when 20 parts beeswax was substituted in the cream formulation for the wax blend. The creams prepared with beeswax also showed first signs of phase separation after 7 days with complete phase separation within 3 weeks. When 1.5 parts sorbitan monostearate was included in the above formulation with the wax blend of Example III the stability of the emulsion at 37° C. was markedly improved so that even after 3 weeks only a slight amount of liquid separated.

Example VI

Twenty parts natural Japan wax was substituted for the synthetic mixed glycerides in the wax composition of Example III. No appreciable difference in the wax composition could be observed. A borax emulsion employing the wax had excellent texture and stability.

Example VII

A wax composition was prepared by melt blending 40 grams of the $C_{32+}$ α-heptyl branched monocarboxylic acid of Example I(B), 20 grams of the mixed glyceride of Example II and 10 grams 190/195 microcrystalline wax. The resulting composition was uniform, had good color and formed a stable borax emulsion having good gloss and texture.

Example VIII

The wax blend of Example III was employed in the following cream formulations where beeswax is typically employed:

| Emollient cream: | Grams |
|---|---|
| Wax blend | 16 |
| Mineral oil (70 vis.) | 30 |
| Oil (Humble 575) | 20 |
| Glycerine | 33.5 |
| Triethanolamine | 1.0 |
| Cleansing cream: | |
| Wax blend | 10.8 |
| Isostearic acid | 4.0 |
| Propyleneglycol dipelargonate | 5.0 |
| Polyethylene glycol monoisostearate | 5.8 |
| Oil (Humble 575) | 20.0 |
| Glycerine | 4.5 |
| 2-amino-2-methylol-1,3-propanediol | 2.0 |
| Methyl paraben | 0.07 |
| Propyl paraben | 0.07 |
| Water | 46.8 |

The emulsions obtained had superior appearance, feel and excellent stabilities. The creams upon application were smooth with no appreciable drag and were rapidly rubbed into the skin to produce a marked softening without appearing or feeling excessively greasy.

I claim:
1. A wax composition useful as a substitute for naturally occurring waxes comprising:
about 45 to 70% by weight, based on the total composition, of (a) a saturated α-alkyl branched monocarboxylic acid or mixture thereof, said acids containing from about 20 to about 60 carbon atoms with the alkyl group containing from about 1 to 16 carbon atoms;

about 15 to 40% by weight (b) mixed glycerides of saturated mono- and dicarboxylic acids selected from the group consisting of Japan wax and compositions obtained by the reaction of 1 to 4 mols monocarboxylic acid containing 14 to 20 carbon atoms, 0.25 to 1.5 mols short-chain dicarboxylic acid containing 6 to 12 carbon atoms and 1 mole glycerine; and about 5 to 25% by weight of (c) a microcrystalline petroleum wax melting between 180° and 200° F.

2. The wax composition of claim 1 comprised of 50 to 65% by weight, based on the total composition, of (a), 20 to 35% by weight (b), and 10 to 20% by weight (c).

3. The wax composition of claim 1 wherein (a) is comprised of at least 65% by weight monocarboxylic acids containing 30 or more carbon atoms wherein the alkyl group contains from 1 to 8 carbon atoms; (b) is a composition obtained by the reaction of 1.5 to 2.5 mols monocarboxylic acid, 0.5 to 1 mols dicarboxylic acid and 1 mol glycerine; and (c) is a microcrystalline petroleum wax metlting between about 190° and 195° F.

4. The wax composition of claim 3 wherein (a) comprises about 50 to 65% by weight of the total composition with about 20 to 35% by weight (b) and about 10 to 20% by weight (c).

5. The wax composition of claim 3 wherein (b) is obtained by the reaction of palmitic or stearic acid with azelaic acid and glycerine.

6. The wax composition of claim 5 wherein a mixture of stearic and palmitic acid are employed.

7. The wax composition of claim 3 melting in the range from about 55 to 75° C., having an acid value from about 40 to 50 and a saponification value from about 90 to 115.

8. The wax composition of claim 3 wherein the alkyl group is methyl.

References Cited

UNITED STATES PATENTS

| | | | |
|---|---|---|---|
| 2,385,849 | 10/1945 | Snell et al. | 106—270 |
| 2,523,848 | 9/1950 | Schaerer et al. | 106—270 |
| 3,257,329 | 6/1966 | Motiuk et al. | 106—270 |

ALLAN LIEBERMAN, Primary Examiner

U.S. Cl. X.R.

252—311.5; 424—64, 65